United States Patent
Silton et al.

(10) Patent No.: US 6,335,926 B1
(45) Date of Patent: Jan. 1, 2002

(54) DYNAMIC CONFIGURATION OF EDGE FORWARDERS TO ROUTE SERVERS IN A DISTRIBUTED ROUTER SYSTEM

(75) Inventors: Roderick P. Silton, Herndon, VA (US); Richard A. Chan, Kanata (CA); Ramana Gollamudi, Reston, VA (US)

(73) Assignee: Newbridge Networks Corporation, Kanata (CA)

(*) Notice: Subject to any disclaimer, the term of this patent is extended or adjusted under 35 U.S.C. 154(b) by 0 days.

(21) Appl. No.: 09/166,551

(22) Filed: Oct. 5, 1998

(30) Foreign Application Priority Data

Oct. 3, 1997 (CA) .............................................. 2217267

(51) Int. Cl.[7] .............................................. H04L 12/28
(52) U.S. Cl. ...................... 370/351; 370/396; 709/238
(58) Field of Search .................... 370/351, 356, 370/395, 396, 401, 402, 428, 363, 364, 365, 254, 397, 409, 410; 709/238, 250

(56) References Cited

U.S. PATENT DOCUMENTS

| | | | | |
|---|---|---|---|---|
| 5,600,644 A | * | 2/1997 | Chang | 370/404 |
| 5,822,320 A | * | 10/1998 | Horikawa | 370/396 |
| 5,951,649 A | * | 9/1999 | Dobbins | 370/351 |
| 6,005,864 A | * | 12/1999 | Krause | 370/395 |
| 6,009,097 A | * | 12/1999 | Han | 370/395 |

* cited by examiner

*Primary Examiner*—Douglas Olms
*Assistant Examiner*—Ricardo M. Pizarro
(74) *Attorney, Agent, or Firm*—Larson & Taylor, PLC

(57) ABSTRACT

A configuration server is incorporated into a distributed router to support multiple route servers in an internetworking system. The multiple route servers in the system provide load sharing and/or standby functionality. In the system route servers provide routing decisions while edge forwarders are the packet forwarding elements. The configuration server is responsible for mapping edge forwarders to route servers.

16 Claims, 4 Drawing Sheets

DYNAMIC CONFIGURATION OF EDGE FORWARDERS TO ROUTE SERVERS IN A DISTRIBUTED ROUTER SYSTEM

FIELD OF THE INVENTION

This invention relates to internetworking architectures, such as multi-protocol over ATM (MPOA) and, more particularly, to a distributed router system having multiple routing and forwarding components with a configuration server to map the forwarding components to the routing components.

BACKGROUND

The ATM Forum's multi-protocol over ATM (MPOA) introduces the concept of internetworking service features between local area networks over an asynchronous transfer mode (ATM) backbone. This internetworking service relies on local area network emulation (LANE) principles to establish and control connectivity. Co-pending U.S. application Ser. No. 08/676,256, filed Sep. 16, 1996 and assigned to the assignee of the present application, provides greater detail respecting the implementation of an MPOA type switch system.

A more recent development relating to MPOA is Newbridge Network Corporation's internetworking (CSI) solution which provides internetworking service to multiple sub-networks by introducing the concept of Realms. CSI embodies a non-broadcast multi-access (NBMA) network based platform on which multiple and different types of internetworking servers are provided. An NBMA network is a form of virtual connection oriented backbone network, examples of which are ATM and Frame-Relay networks.

Examples of internetworking services include virtual private network (VPN) service and public Internet service. In CSI, a Realm is defined by a specific instance of an Internet or VPN service. Canadian patent application serial no. 2,217,275 (Agent's docket no. 94218), filed on Oct. 3, 1997 and assigned to the assignee of the present application, provides greater detail with respect to the CSI system.

Distributed routers, as implemented in MPOA and CSI, separate the forwarding component from the routing decision. In the aforementioned CSI system, the entity serving as the forwarding component is a forwarder and the entity making the routing decision is known as a route server.

Route servers provide an essential part of switched routing in the CSI system: route calculation and route distribution. A route server performs the complex routing computations and downloads simple forwarding tables derived therefrom to the forwarders The route servers run all the required internal and external routing protocols in the CSI system to provide both default connectivity and short-cut connections.

Edge forwarders are a particular type of forwarder employed in CSI. An edge forwarder is the logic component of the CSI system that performs the layer 3 edge forwarding functions, examples of which are the internetworking services card (ISC) for Newbridge's 3617 Multi-services switch and Ridge forwarding engines. Together with the route servers, the edge forwarders provide routing services for host and customer devices connected to the CSI system.

The edge forwarders are configured statically with route server addresses to which they communicate for functionality. Such static address mapping thus requires reconfiguration whenever a route server's point of attachment to the network is changed either manually or due to redundancy switchover.

SUMMARY OF THE INVENTION

It is an object of the present invention to satisfy the above limitation by introducing a configuration server which is responsible for mapping forwarders to route servers.

Therefore, in accordance with a first aspect of the present invention there is provided in a communications network for providing internetworking service function over an NBMA network a distributed routing system comprising: a plurality of routing means to generate and download forwarding tables respecting traffic through the networks; a plurality of forwarding means to implement forwarding functions according to the forwarding tables; and configuration means to dynamically configure interactivity between the routing means and the forwarding means.

BRIEF DESCRIPTION OF THE DRAWINGS

The invention will now be described in greater detail having reference to the attached drawings wherein.

DETAILED DESCRIPTION

Figure 1:
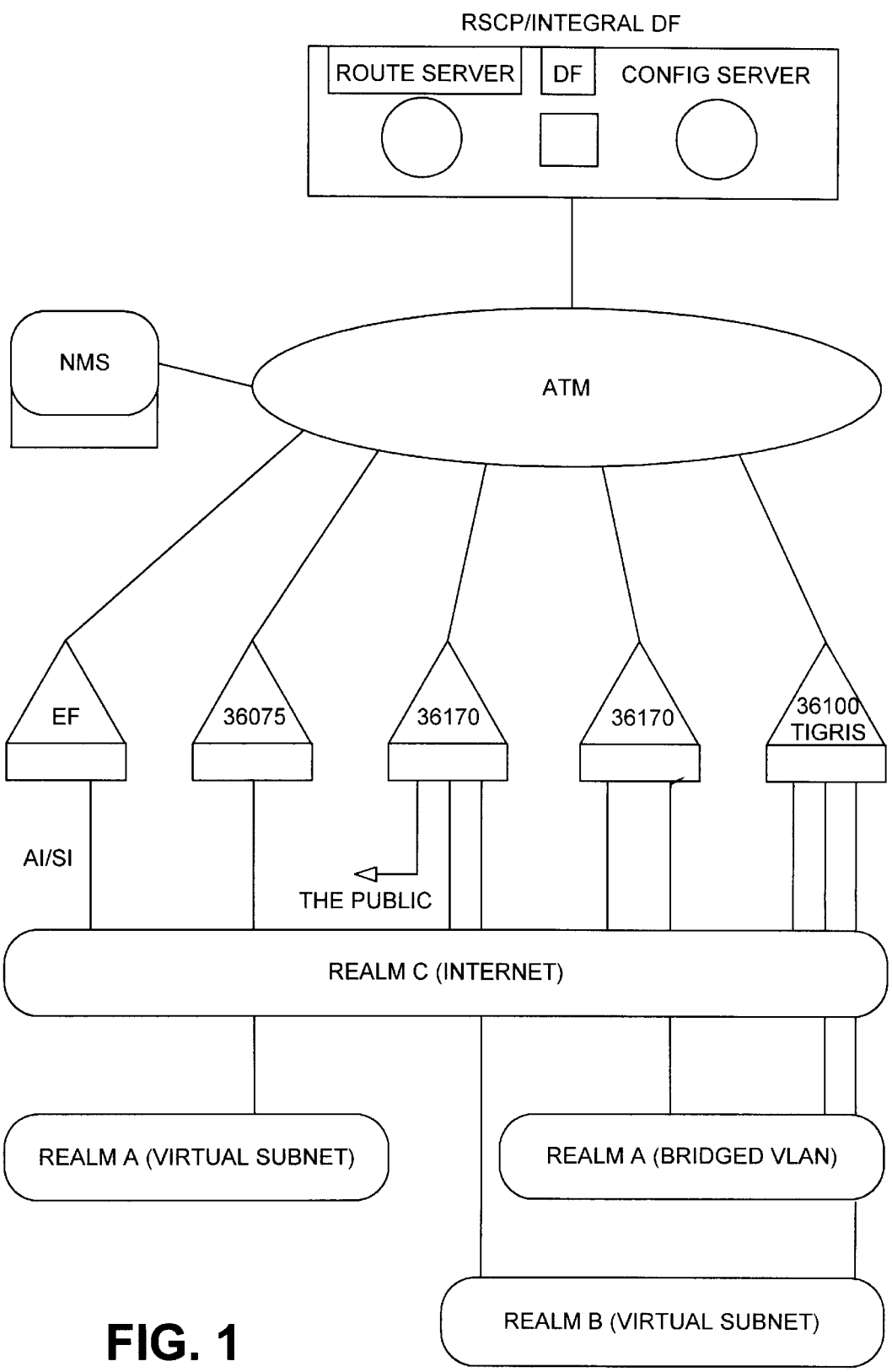
FIG. 1 illustrates one example of a CSI system including router server, edge forwarders and a configuration server.

FIG. 1 illustrates a small but typical CSI system showing the relationship between various elements therein. In FIG. 1, Edge Forwarders (EFs) are identified as PIPES (Packet Internetworking Processing Engine), for example, the ISC in Newbridge's 36170. Also shown is a configuration server (CONS), in accordance with the present invention, a core forwarder, access terminations, route servers, and the ATM transport fabric. The configuration server provides the EFs (PIPES) and other elements in the system with the details about connections and other parameters necessary to bring the system to an operational state. Furthermore, FIG. 1 shows how the CSI system could be used by a network operator to provide a mix of services to various customers while maintaining the necessary partitioning of control information and traffic load.

While the following description of the distributed router system will make reference to CSI, it is to be understood that the basic concept of providing a configuration server to facilitate interaction between the forwarding components and the routing components can be readily applied to alternate implementations.

In order to support a scalable and robust distributed router, it is advantageous to have multiple route servers spread throughout the topology of the NBMA (e.g. ATM) network. The multiple route servers can be used to provide load sharing or stand-by functionality. The present invention introduces the concept of the configuration server which is responsible for the dynamic mapping of Edge Forwarders to route servers. In order to support this, it is necessary to have a method of dynamically configuring the Edge Forwarder to use a specific route server for a specified set of functionality.

Edge forwarder devices are commissioned with the NBMA address of the configuration server. The configuration server address may be, for example, an ATM anycast address. When the edge forwarder device is activated it registers itself with the configuration server. The purpose of this registration is simply for the configuration server to learn of the existence and address of the specific edge forwarder. Similarly, route servers also register with the configuration server.

After the edge forwarder is registered, the configuration server sends configuration details to the Edge Forwarder One of the key pieces of configuration is the address service download. The address service includes a table of a variable numbers of rows, each row of the table having at least the following information: ATM address of a route server; and ATM traffic parameters for the various types of connections an edge forwarder can have with a route server. After the table is downloaded, the edge forwarder connects via the ATM network to the list of route servers.

In the CSI system, the configuration server has three main tasks which are: 1) to reply to requests from edge forwarders as to the whereabouts of their route servers; 2) to download load configuration information to the route servers regarding the virtual private networks, routing protocols and other configuration information required by the route server to run; and 3) track the route servers status and activity, i.e. which route servers are active and which ones are on stand-by.

Figure 2:
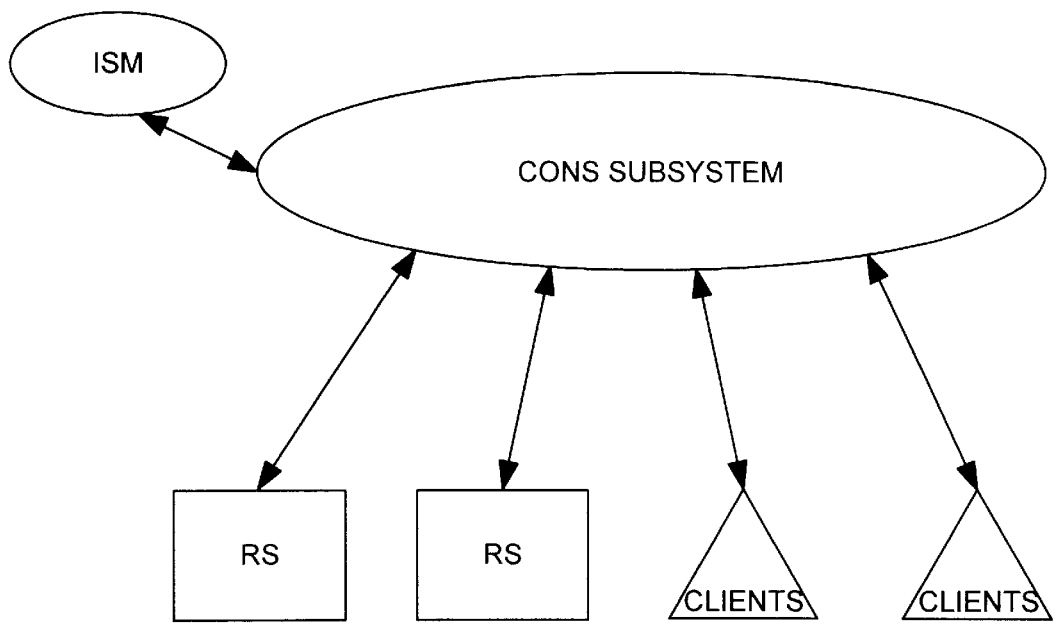
FIG. 2 illustrates a basic configuration server application.

FIG. 2 illustrates a typical deployment of a configuration server (CONS) in the CSI system. The CONS appears as a single subsystem to its clients, but the subsystem may actually encompass multiple physical or logical entities. CSI clients (e.g., Route Servers and Forwarders) connect to this subsystem and download their respective configurations.

The Forwarder type CSI clients (eg., PIPI, NICs, Ridges, etc.) connect to the CONS, and are downloaded with a list of RSs to which they need to connect. These clients may then get additional configuration data from the RSs or CONS. Any change in the RS list is conveyed to the Forwarders dynamically by the CONS.

The CSI RSs receive the system and realm data and redundancy information from the CONS. Any changes in this information is dynamically updated to the RSs. A network management system, referred to herein as the Internetworking Services Manager (ISM), also connects to this subsystem to create and update various configuration tables. In addition CONS also keeps track of the status of all RSs and clients in the system.

Figure 3:
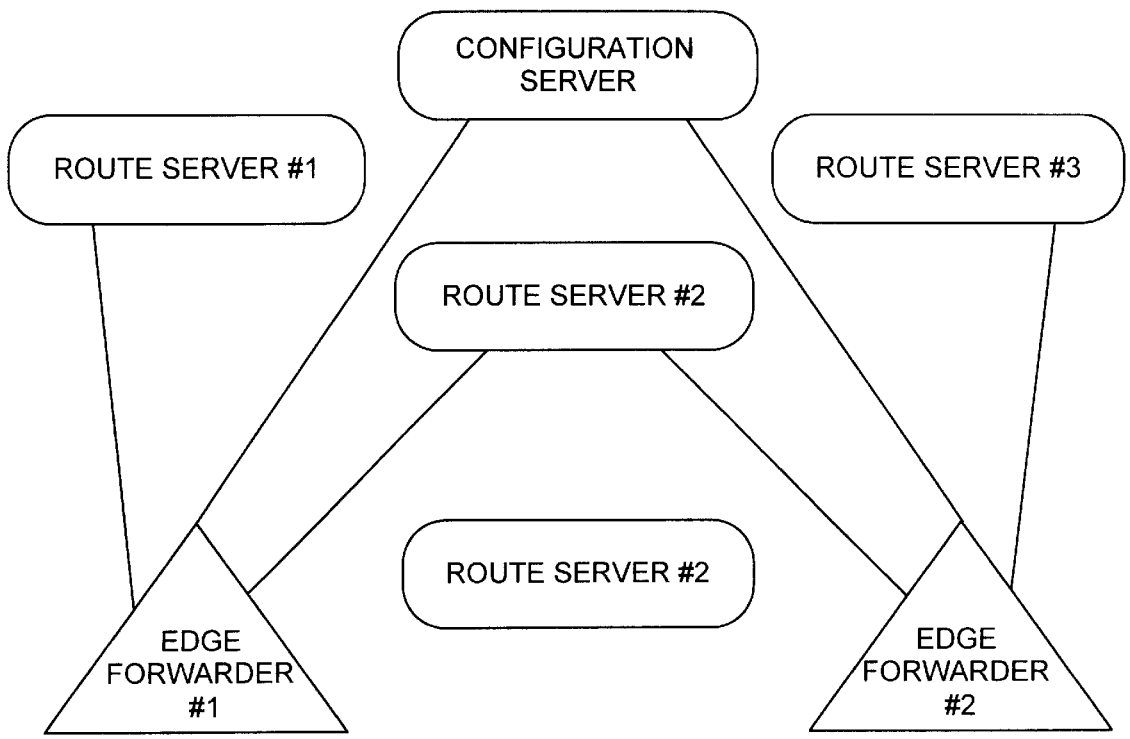
FIG. 3 is an example of how edge forwarders can be associated with route servers.

FIG. 3 gives a simplified example of how multiple edge forwarders and router servers can be associated with each other. In this example, edge forwarder No. 1 is serviced by route servers 1 and 2 while edge forwarder No. 2 is serviced by router servers 2 and 3. At any time, transactions may be done on the address service table such as an add, delete or change of a table entry. These transactions can be used to make or break edge forwarder to route server associations on the fly.

Figure 4:
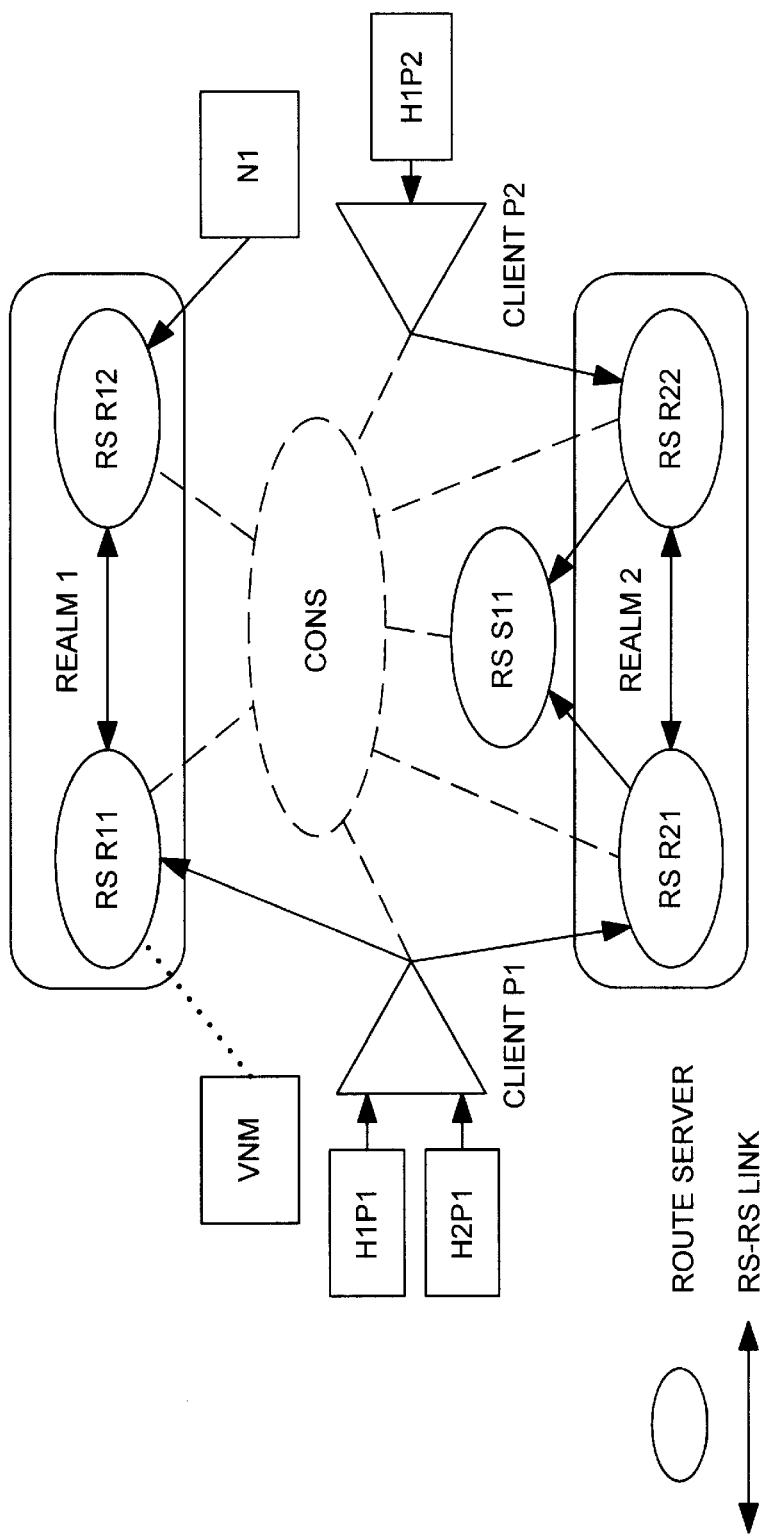
FIG. 4 introduces the configuration servers in a realm environment.

FIG. 4 illustrates route servers which are in specific realms and shows their relationship to edge forwarders and the configuration server.

FIG. 4 also depicts route servers (RS) R11 and R12 which are in realm1 serving host H1P1 connected to PIPE P1, and host on NIC N1. It also shows route servers R21 and R22, which are in realm2, serving hosts H2P1 and H1P2.

The route servers in each realm use RS-RS links to exchange routes and providenext hop resolution protocol (NHRP) resolution for the edge devices.

The standby RS S11 provides redundancy support to route servers R11 and R12. If one of them goes down, S11 takes over.

Note that the route server implements an RS Client component to the configuration server (CONS) to obtain the RS configuration data, such as realm and redundancy information. The RS client also queries the CONS for other route servers and receives user-initiated changes to the RS groups through the CONS.

Operation of the dynamic binding algorithm, in accordance with the present invention, is described in the following The algorithm is implemented in three different logical components of the CSI architecture, namely the CSI forwarders, Route Servers and the Configuration Server. This algorithm enables the forwarders to automatically connect to the correct Route Servers which provide service. This will accommodate changes in Route Server NBMA address and failure of the RS.

Figure 5:
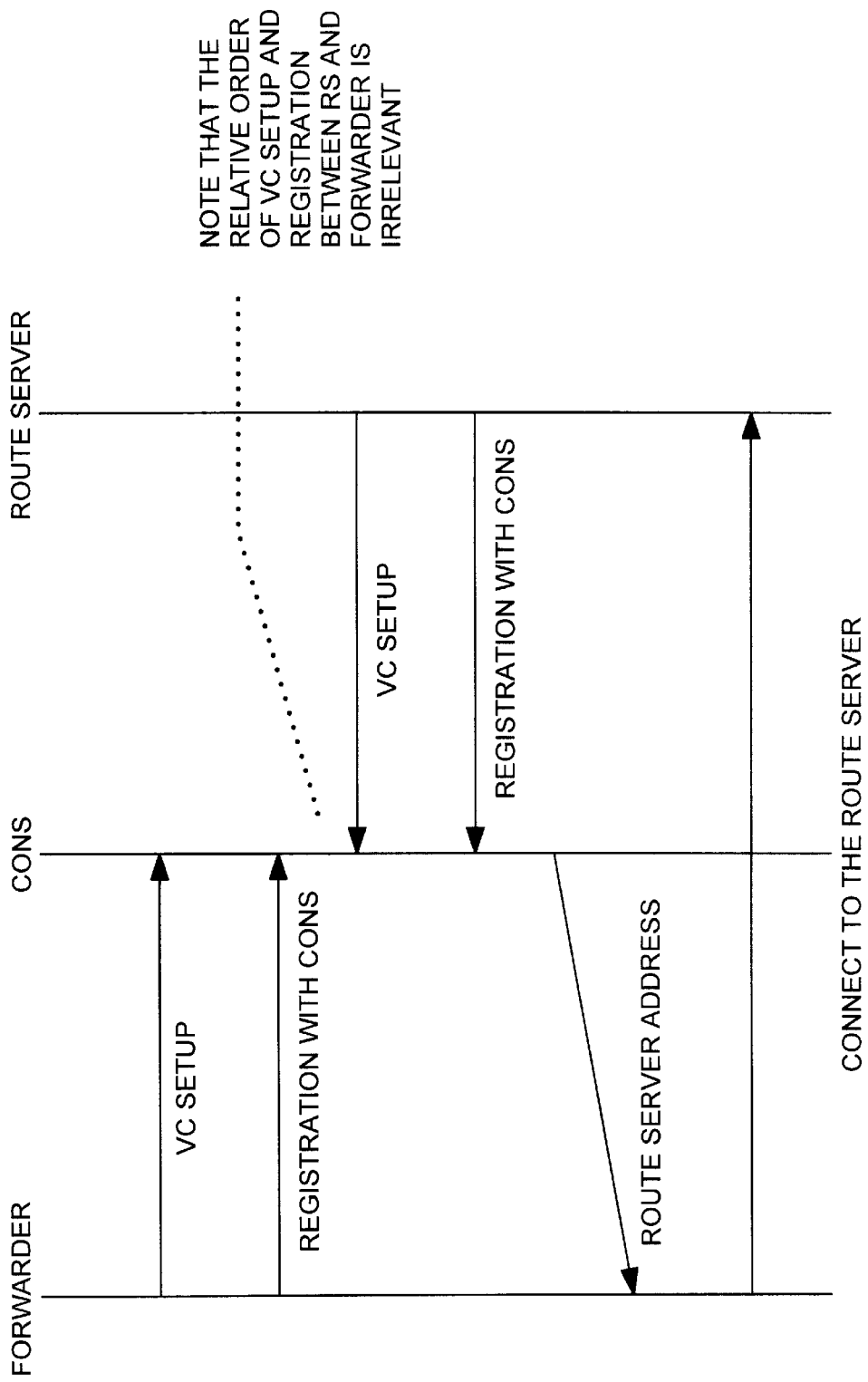
FIG. 5 is a ladder diagram illustrating interaction between a forwarder, router server and configuration server.

To explain the algorithm better, the example network in FIG. 3 is used. To further illustrate the actions and interactions between the components, a ladder diagram shown in FIG. 5 is used. In this diagram, the vertical lines represent the different components in the CSI system. The horizontal or nearly horizontal lines represent the interactions or messages that occur between the two components. The arrows on the horizontal lines represent the recipient of the message or interaction. The descriptive part of the algorithm for each component consists of the series of steps that the component must execute.

At start up, a device implementing the CSI forwarder functionality is configured with the NBMA address of the CONS. As already mentioned before, this address could be an anycast address, if the NBMA network supports such types of addresses. When such a device is connected to the CSI network the following steps occur so that the forwarder can setup associations with the correct Route Servers.

1) Association with CONS

The forwarder must set up an association with the CONS. This association consists of setting up a virtual circuit (VC) and registering with the CONS. The VC setup is done by signaling to the attached network using the mechanisms supported by the network. Once a VC is setup, the forwarder sends messages over the VC to register with the CONS. Registration is done to verify the identity of the forwarder to the CONS. Obviously, the forwarder must already be configured with an unique identity.

2) Configuration Download

If registration succeeds CONS will then send configuration information to the CSI forwarder. This information will consist of a series of messages. One such set of messages will list a table of different Route Servers that the forwarder must contact for service for the routing services it needs. The NBMA addresses of these Route Servers are also provided in the table.

3) Association with Route Servers

The forwarder then sets up associations with the different Route Servers. This consists of two steps, VC setup to the Route Server and registering with the Route Server. In step 1, the CSI forwarder tries to setup the VC to each of the Route Servers that the CONS told the forwarder. After the VC setup is successful, the forwarder then registers with the Router Server. The registration process involves sending messages to the Route Server informing the identity of the forwarder identity among other things. Once registration is successful, the forwarder can receive routing services from the Route Server.

4) If for any reason, the VC to a Route Server disconnects the forwarder repeats Step 3. The VC to a Route Server could disconnect due to failure of the Route Serve machine or the fact that the Route Server is removed from the network and reconnected at a different point in the network.

5) The CONS can delete or add an entry to the table of Route Servers on the forwarder at any time. The association with the CONS is maintained as long as the forwarder is connected to the network. If the association with the CONS fails, the forwarder continues to work with the table sent previously by the CONS.

Any device that implements the functionality of the CSI Route server is configured with the NBMA address of the CONS. As already mentioned before, this address could be an anycast address, if the NBMA network supports such types of addresses. When such a device is connected to the CSI network the following steps occur so that the forwarder can setup associations with the correct Route Servers.

1) Association with CONS

The Route Server must set up an association with the CONS. This association consists of setting up a virtual circuit (VC) and registering with the CONS. The VC setup is done by signaling to the attached network using the mechanisms supported by the network. Once a VC is setup, the Route Server sends messages over the VC to register with the CONS. The Route Server registers with the CONS to indicate that it is available for providing service. It also supplies the CONS with the address of the NBMA address of the point of attachment to the network. CONS then assigns this Route Server for service to a set of forwarders and an identity to the Route Server.

2) Once registered, the Route Server waits for CSI forwarders to contact it.

In the CSI system, CONS provides the information that forwarders use to discover Route Servers and connect with them. To achieve this, both Route Servers and forwarders must bind with the CONS. CONS maintains the following tables to perform its functions:

1) Route Server Pool Table
2) Forwarder-Route Server Binding Table

The Route Server Pool Table keeps track of the available Route Servers, their IDs and their registration status with the CONS and their present NBMA addresses. This is shown in Table 1 below. As and when Route Servers register with the CONS their registration status is set to 'registered'. An ID is assigned to the route server. This ID may be automatically derived or pre-configured by a user. The exact mechanism of generating the Route Server ID is beyond the domain of this invention.

TABLE 1

| S. No | Route Server ID | Registration Status | Present NBMA Address | Other Information |
|---|---|---|---|---|
| 1 | RS 1 | Registered with CONS or Not registered | 1.2.30.. | |
| 2 | Ö | Ö. | Ö. | |

It is to be noted that the route server may be either a physical or logical entity. The logical route server represents an instance of route server functionality effected on a physical device, where the route server ID is attached to the instance and not the physical device.

Each row of the Forwarder-Route Server Binding table (Table 2) contains:

1) A forwarder Identification
2) The Route Server Id that services this forwarder

TABLE 2

| S. No. | Forwarder ID | Route Server ID | Association Parameter |
|---|---|---|---|
| 1. | Forwarder ID 1 | RS 1 | ÖÖ |

If a forwarder is provided service by more than one Route Server then there is more than one row in the binding table for the same forwarder identification. Entries in the forwarding table are either configured or are made using some set of rules which determine how an available Route Server should be assigned to a forwarder. It is not necessary that a forwarder be registered with the CONS for filling rows in table 2.

When a forwarder registers with the CONS, the CONS can use the information in the above tables to determine the Route Servers that the forwarder must connect to and the Route Servers NBMA address. These are then sent down to the forwarder.

Turning now to the sequence of actions in CONS:

1) When an Forwarder sets up a VC to the CONS, start the registration processing of the forwarder.
2) After registration processing of the forwarder is completed, compute the information required for the forwarder using the two logical tables described above. This information consists of but is not limited to the following; Route Server ID, its NBMA address, the characteristics of the VC that are to be used when setting up the VC to the Route Server. Multiple sets of such information may be computed and sent to the forwarder.
3) If an user reconfigures the binding between a forwarder and a route server, send messages to the forwarder removing old binding and inform the forwarder about the new binding. These messages are sent using the Forwarder-CONS SVC.
4) If a Route Server disconnects from the network then inform all the forwarders using the Route Server that the forwarder Route Server binding is no longer available.
5) When a route Server newly registers, inform all registered forwarders that use this route server the ATM address of this route server.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

What is claimed is:

1. A method of implementing a routing process to provide internetworking service functions over a non-broadcast multi-access (NBMA) network having a distributed routing system comprising:

configuring a forwarding means with an NBMA address of a configuration server in the network by setting up a virtual circuit to said configuration server and registering with said configuration server;

downloading, from said configuration server, a list of routing means that said forwarding means need to contact in order obtain routing services;

setting up a virtual circuit from said forwarding means to an appropriate routing means and registering with said routing means upon set up; and receiving at said forwarding means internetworking routing services from said routing means.

2. The method as defined in claim 1 wherein the NBMA address is an anycast address.

3. The method as defined in claim 2 wherein said forwarding means are edge forwarders and said routing means are route servers.

4. The method as defined in claim 3 wherein said configuration server is able to dynamically add or delete an entry on said list of route servers.

5. The method as defined in claim 3 wherein said route servers register with said configuration server to indicate that they are available to provide service.

6. The method as defined in claim 5 wherein, upon registration with said configuration server, said route servers await said edge forwarders to make connection for services.

7. The method as defined in claim 3 wherein said configuration server maintains tables relating to available route servers including identification numbers, registration status with the configuration server and their present NBMA address.

8. The method as defined in claim 7 wherein said configuration server also maintains tables relating to edge forwarder and route server binding information including edge forwarder identification and identification of a route servers that service respective edge forwarders.

9. A distributed routing system for implementing a routing process to provide internetworking service functions in a non-broadcast multi-access (NBMA) network, said routing system comprising:

a configuration server;

a forwarding means configured with an NBMA address of said configuration server by a virtual circuit, said forwarding means being registered with said configuration server and having, downloaded from said configuration server, a list of routing means that said forwarding means needs to contact in order to obtain routing services; and a virtual circuit set up from said forwarding means to an appropriate routing means, said forwarding means being registered with said routing means upon set up of the virtual circuit from said forwarding means to said routing means, whereby internetworking routing services are received from said routing means.

10. The system as defined in claim 9 wherein the NBMA address is an anycast address.

11. The system as defined in claim 10 wherein said forwarding means are edge forwarders and said routing means are route servers.

12. The system as defined in claim 11 wherein said configuration server is able to dynamically add or delete an entry on said list of route servers.

13. The system as defined in claim 11 wherein said route servers register with said configuration server to indicate that they are available to provide service.

14. The system as defined in claim 13 wherein, upon registration with said configuration server, said route servers await said edge forwarders to make connection for services.

15. The system as defined in claim 13 wherein said configuration server maintains tables relating to available route servers including identification numbers, registration status with the configuration server and their present NBMA address.

16. The method as defined in claim 15 wherein said configuration server also maintains tables relating to edge forwarder and route server binding information including edge forwarder identification and identification of route servers that service respective edge forwarders.

* * * * *